US010165216B2

(12) United States Patent
Otake et al.

(10) Patent No.: US 10,165,216 B2
(45) Date of Patent: Dec. 25, 2018

(54) IMAGING DEVICE, CAMERA SYSTEM, AND IMAGING METHOD

(71) Applicant: RENESAS ELECTRONICS CORPORATION, Tokyo (JP)

(72) Inventors: Ryota Otake, Tokyo (JP); Tatsuya Kitamori, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/470,045

(22) Filed: Mar. 27, 2017

(65) Prior Publication Data

US 2017/0280083 A1 Sep. 28, 2017

(30) Foreign Application Priority Data

Mar. 28, 2016 (JP) ................................ 2016-063526

(51) Int. Cl.
*H04N 5/378* (2011.01)
*H04N 5/353* (2011.01)
*H04N 5/355* (2011.01)
*H04N 5/369* (2011.01)

(52) U.S. Cl.
CPC ............ *H04N 5/378* (2013.01); *H04N 5/353* (2013.01); *H04N 5/35545* (2013.01); *H04N 5/3696* (2013.01)

(58) Field of Classification Search
CPC ...... H04N 5/378; H04N 5/3696; H04N 5/353; H04N 5/35545
USPC ........ 348/294–324; 250/208.1; 257/290–292
See application file for complete search history.

(56) References Cited

U.S. PATENT DOCUMENTS 5,455,621 A 10/1995 Morimura
2016/0191832 A1* 6/2016 Inui .................... H04N 5/3696 348/300

FOREIGN PATENT DOCUMENTS

JP H06-141229 A 5/1994

* cited by examiner

*Primary Examiner* — Yogesh K Aggarwal
(74) *Attorney, Agent, or Firm* — McDermott Will & Emery LLP

(57) ABSTRACT

In order to provide an imaging device suitable for suppressing a reduction of the frame rate without deteriorating the image quality, a sensor includes two photodiodes for receiving incident light through a microlens, a first transfer transistor that transfers the output electric charges of the first photodiode when a first transfer control signal becomes active, a second transfer transistor that transfers the output electric charges of the second photodiode when a second transfer control signal becomes active, a first output signal line that transmits a first pixel signal depending on the transferred electric charges by the first transfer transistor, and a second output signal line that transmits a second pixel signal depending on the transferred electric charges by the second transfer transistor.

14 Claims, 13 Drawing Sheets

14
VDD RST VDD
Tr13 Tr23
Tx1 Tr11 Tx2 Tr21
Tr12 Tr22
Cfd1 PD1 PD2 Cfd2
Tr14 Tr24
PS1 SEL PS2
OUT1 OUT2

14
RST
SEL
VDD
VDD
Tr11
Tr12
Tr13
Tr14
Tr21
Tr22
Tr23
Tr24
Tx1
Tx2
PD1
PD2
Cfd1
Cfd2
PS1
PS2
OUT1
OUT2

RST2
Tx2
RST1
Tx1
SEL
INTERMEDIATE OF EXPOSURE
SHORT SECOND EXPOSURE
LONG SECOND EXPOSURE
t30
t31
t32
t33
t34
t35
t36
t37
t38
t39

RST
Tx2
Tx1
SEL
EXPOSURE
EXPOSURE
SHORT SECOND EXPOSURE
t40
t41
t42
t43
t44
t45
t46
t47

IMAGING DEVICE, CAMERA SYSTEM, AND IMAGING METHOD

CROSS-REFERENCE TO RELATED APPLICATIONS

The disclosure of Japanese Patent Application No. 2016-063526 filed on Mar. 28, 2016 including the specification, drawings and abstract is incorporated herein by reference in its entirety.

BACKGROUND

The invention relates to an imaging device, a camera system, and an imaging method and, for example, an imaging device, a camera system, and an imaging method suitable for controlling a reduction of frame rate without deteriorating image quality.

In these days, an imaging device mounted in a digital camera has adopted a technique of generating image data with a wide dynamic range or a High Dynamic Range (HDR) composition technique by compositing a plurality of pixel signals generated depending on each output charge of light receiving elements having various exposure times. The HDR composition is disclosed in, for example, Japanese Unexamined Patent Application Publication No. 6-141229.

SUMMARY

In the structure disclosed in the above publication, signals with electric charges accumulated for a short period (signal having a short exposure time) are generated and stored in a memory, and then, when generating and reading signals with electric charges accumulated for a long period (signal having a long exposure time), the signals having the short electric charge accumulated period stored in the memory are read out to be composited together.

In the structure disclosed in the above publication, frame rate is reduced to a half compared with the case of not performing the HDR composition. As the result, for example, an image of a high speed moving object cannot be taken at a high precision. Other objects and novel features will be apparent from the description and the attached drawings of the specification.

An imaging device according to one embodiment includes: a first photoelectric transducer that receives an incident light through a microlens; a second photoelectric transducer that receives an incident light through the microlens common with the first photoelectric transducer; a first transfer transistor that transfers electric charges output from the first photoelectric transducer when a first transfer control signal becomes active; a second transfer transistor that transfers electric charges output from the second photoelectric transducer when a second transfer control signal different from the first transfer control signal becomes active; a first output signal line that transmits a first output voltage depending on the electric charges transferred by the first transfer transistor; and a second output signal line that transmits a second output voltage depending on the electric charges transferred by the second transfer transistor.

According to another embodiment, an imaging method includes the steps of: receiving an incident light through a microlens by a first and a second photoelectric transducers; transferring electric charges output from the first photoelectric transducer when a first transfer control signal becomes active; transferring electric charges output from the second photoelectric transducer when a second transfer control signal different from the first transfer control signal becomes active; and outputting a first output voltage depending on the transferred output electric charges from the first photoelectric transducer and a second output voltage depending on the transferred output electric charges from the second photoelectric transducer, in parallel.

According to the embodiments, there can be provided with an imaging device, a camera system, and an imaging method capable of suppressing a reduction of the frame rate without deteriorating the image quality.

DETAILED DESCRIPTION

Hereinafter, embodiments will be described with reference to the drawings. The drawings are simple views and just because of the simple description of the drawings, the technical range of the embodiments should not be interpreted narrowly. The same reference codes are attached to the same elements and their repeated description is omitted.

The following embodiments, if the necessity arises for the sake of convenience, will be described divided into a plurality of sections or forms; unless otherwise specified, they are mutually related to each other and one is related to the other in a part or in the whole of the modified examples or application examples as the detailed and supplementary description. Further, in case of referring to the number of the elements (including piece, numeric value, amount, and range), in the following embodiments, the number is not restricted to the specific number but may be more or less than the specified number, unless particularly specified and unless restricted to the specified number apparently on the principle.

Further, in the following embodiments, the components (including operation steps) are not always essential unless particularly specified and unless apparently considered compulsory on the principle. Similarly, in the following embodiments, when referring to the shape and the positional relation of the components, they are to include their similarity or approximation unless particularly specified and unless they have apparently different shape and positional relation on the principle. This is true to the above number (including piece, numeric value, amount, and range).

First Embodiment

Figure 1:
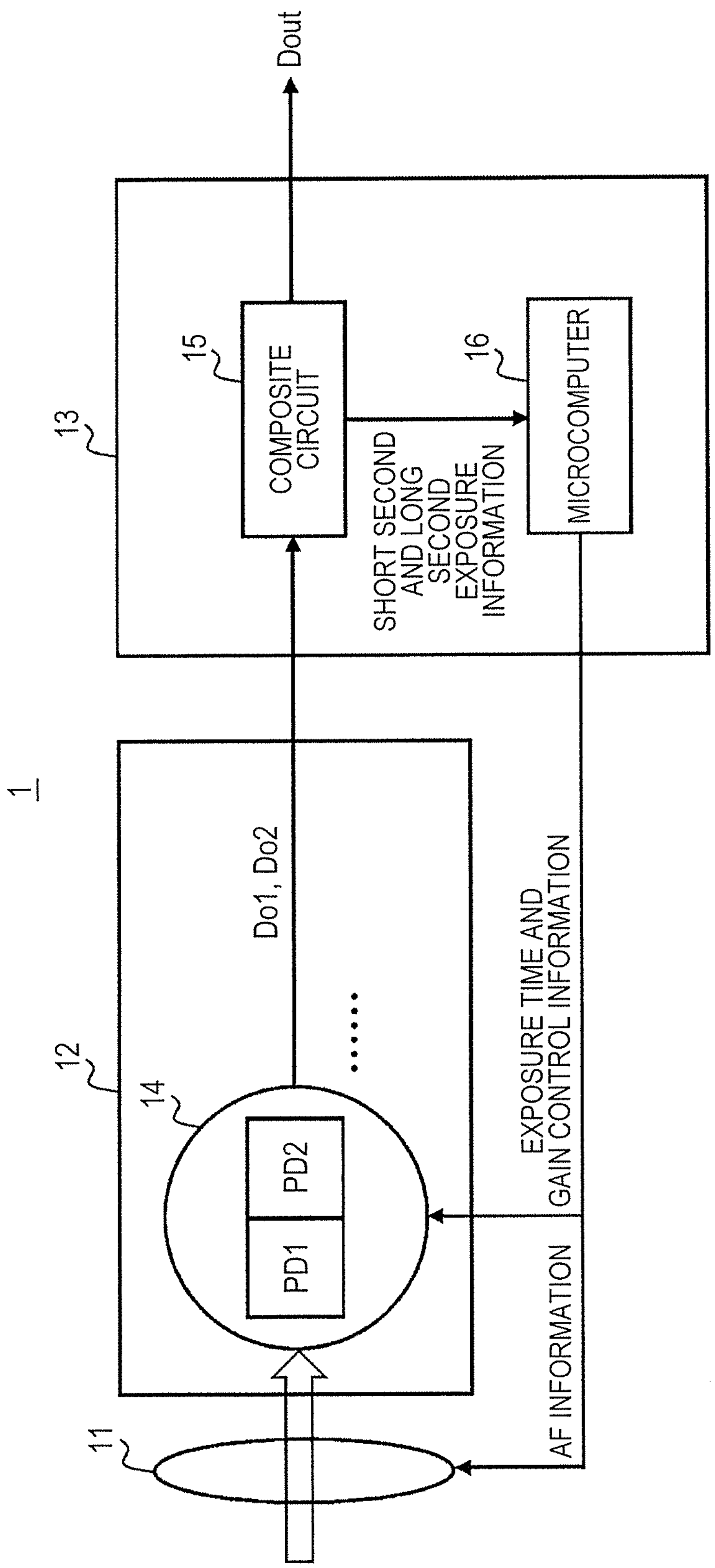
FIG. 1 is a block diagram showing an example of a camera system with a sensor according to a first embodiment.

FIG. 1 is a block diagram showing an example of a camera system 1 with a sensor (imaging device) according to a first embodiment mounted there. In the sensor according to the embodiment, each pixel unit includes two photoelectric transducers for one microlens; one photoelectric transducer is used for doing a long second exposure and the other is used for doing a short second exposure, both in parallel. The sensor and the camera system according to the embodiment can suppress the reduction of the frame rate without deteriorating the image quality. Hereinafter, the details will be described.

As shown in FIG. 1, a camera system 1 includes at least a lens 11, a sensor 12, and a signal processing circuit 13. The camera system 1 adopts the technique of creating image data with a wide dynamic range, in short, the HDR composition technique, by compositing a plurality of pixel signals generated depending on the output charges of the light receiving elements having various exposure times.

The lens 11 is, for example, a focus lens, which is capable of changing the position by an actuator (not illustrated) for adjusting the focus. Although the camera system 1 is provided with a zoom lens and a fixed lens other than the focus lens, they are omitted here.

The sensor 12 receives the light entered through the lens 11, converts it into digital signal, and then outputs the above as image data Do1 and Do2. The image data Do1 is the image data obtained by performing a long second exposure on the light receiving element, for example, made of photodiode and the image data Do2 is the image data obtained by performing a short second exposure on the light receiving element, for example, made of photodiode.

Specifically, the sensor 12 includes a plurality of pixel units 14 arranged in a lattice shape. These pixel units 14 are provided with a plurality of microlens correspondingly on their respective surfaces. Although the details will be described later, each of the pixel units 14 includes the light receiving element made of photodiode and outputs a pixel signal PS1 obtained by performing the long second exposure on the light receiving element and a pixel signal PS2 obtained by performing the short second exposure on the light receiving element using the light entered through the microlens. The pixel signals PS1 of the plural pixel units 14 are output as the image data Do1. The pixel signals PS2 of the plural pixel units 14 are output as the image data Do2.

The signal processing circuit 13 is a circuit for outputting the HDR composited image data Dout by compositing the image data Do1 and Do2 output from the sensor 12.

Specifically, the signal processing circuit 13 includes a composite circuit 15 and a microcomputer 16. The composite circuit 15 composites the image data Do1 and Do2 output from the sensor 12, hence to output the HDR composited image data Dout. This image data Dout is, for example, displayed on a monitor (not illustrated) or stored in a storing device (not illustrated). According to the composite results by the composite circuit 15, the microcomputer 16 outputs the information about the exposure time as for the long second exposure and the short second exposure and the information about the gains of the image data obtained by the long second exposure and the short second exposure.

For example, when the microcomputer 16 determines that the exposure time for the long second exposure is too long according to the composite results by the composite circuit 15, it outputs the information for instructing the sensor 12 to shorten the exposure time for the long second exposure or outputs the information for instructing the sensor 12 to adjust the gain of the pixel signal PS1 obtained through the long second exposure. Alternatively, when the microcomputer 16 determines that the exposure time for the long second exposure is too short according to the composite results by the composite circuit 15, it outputs the information for instructing the sensor 12 to lengthen the exposure time for the long second exposure or outputs the information for instructing the sensor 12 to adjust the gain of the pixel signal PS1 obtained through the long second exposure. This is the same as for the short second exposure. The information is fed back to the sensor 12 and the sensor 12 adjusts the exposure time and the gain based on the fed back information.

Further, the microcomputer 16 outputs the information (autofocus information; hereinafter, also referred to as AF information) for adjusting the position of the lens 11 according to the composite results by the composite circuit 15.

For example, when the microcomputer 16 determines that the lens is out of focus, according to the composite results by the composite circuit 15 (in short, the image data Dout), it creates the AF information for moving the lens 11 to the position in focus. The AF information is fed back to the actuator (not illustrated) for moving the position of the lens 11 and according to the fed back AF information, the actuator moves the position of the lens 11.

(Previous Consideration by the Inventor et al.)

Before describing the details of the sensor (imaging device) 12 mounted on the above mentioned camera system 1, at first, a sensor 52 examined by the inventor et al. will be described.

Figure 11:
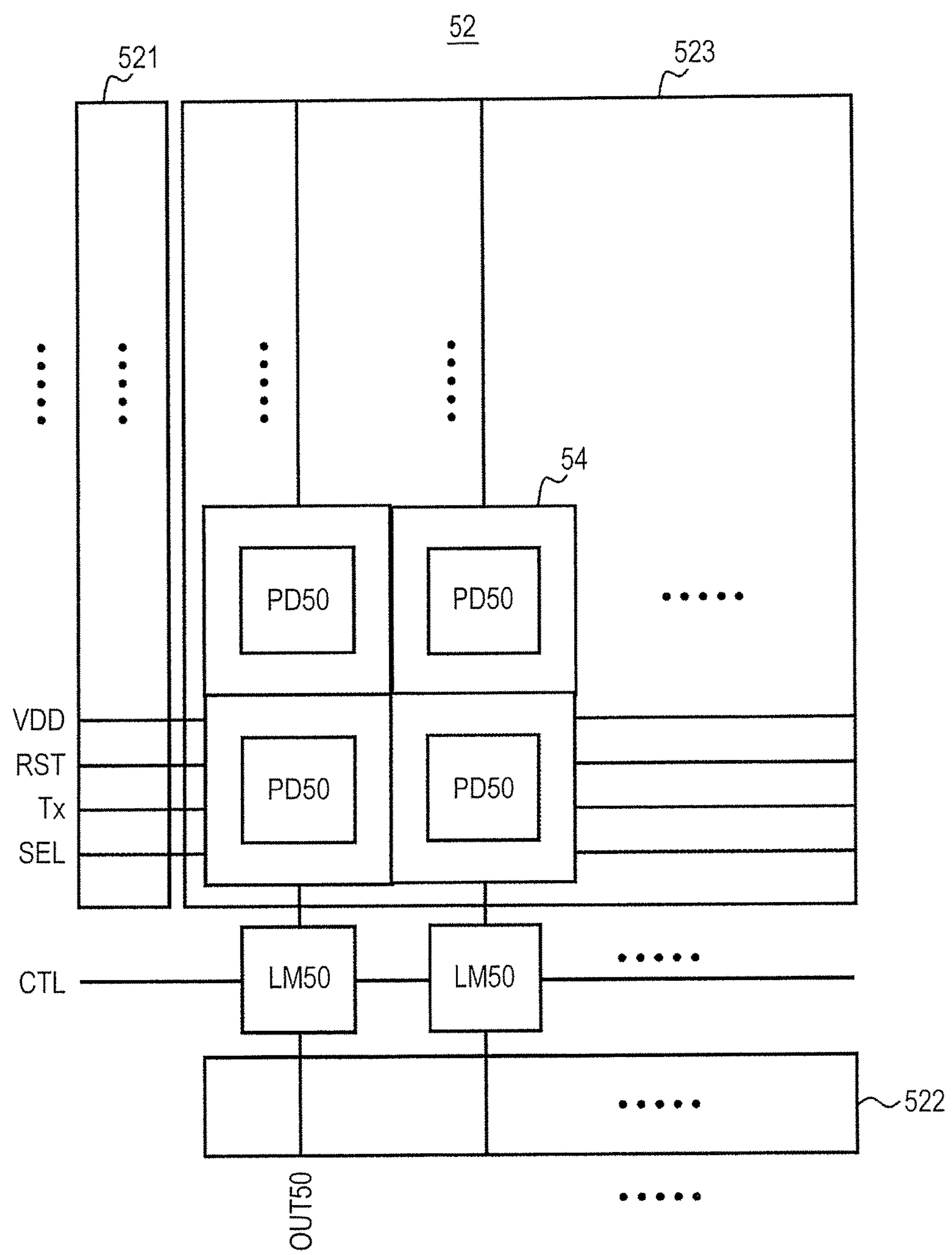
FIG. 11 is a schematic view showing one example of the layout of a sensor in the conventional concept before arriving at the embodiments.

FIG. 11 is a schematic view showing one example of the layout of the sensor 52 related to the concept before arriving at the first embodiment. FIG. 11 shows the layout of a row controller 521, a column controller 522, and a pixel array 523 only, of the whole layout of the sensor 52.

As shown in FIG. 11, the pixel array 523 is formed by a plurality of pixel units 54 arranged in a lattice shape. The row controller 521 controls the activation state of the plural pixel units 54 arranged in a lattice shape in every column. The column controller 522 reads a plurality of pixel signals read from the plural pixel units 54 arranged in the activated column by the row controller 521, in every row. The column controller 522 is provided with a select circuit for selecting one of the plural pixel signals and an output buffer for driving a pixel signal selected by the select circuit.

The plural pixel units 54 arranged in a lattice shape are provided with a plurality of microlens (not illustrated) correspondingly on their surfaces. Each of the pixel units 54 has a photodiode PD50 forming a light receiving element, creates a pixel signal PS1 obtained by performing the long second exposure on the photodiode PD50 and a pixel signal PS2 obtained by performing the short second exposure on the photodiode PD50, then to composite the both and output the above. The respective pixel signals of the plural pixel units 54 are output externally as the image data Dout. The sensor 52 includes a function of the composite circuit 15.

Figure 12:
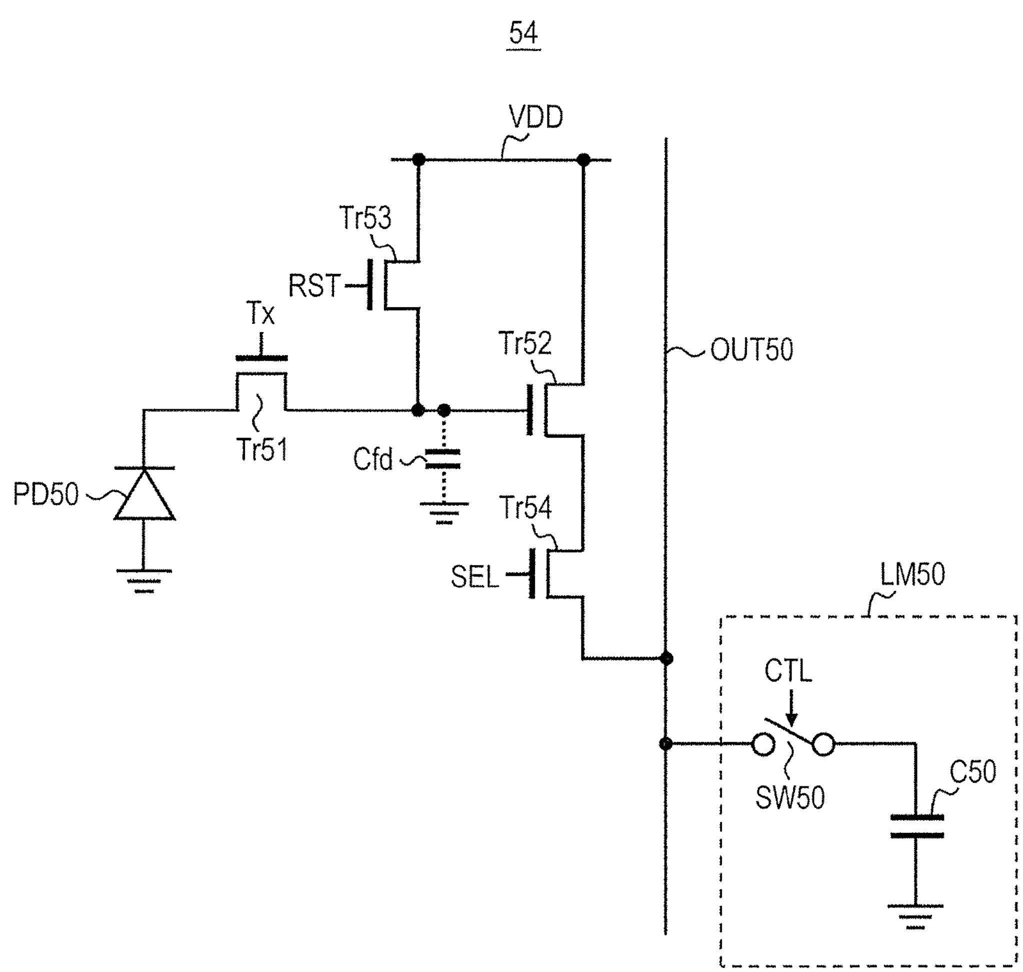
FIG. 12 is a circuit diagram showing an example of a pixel unit in the conventional concept before arriving at the embodiments.

FIG. 12 is a circuit diagram showing an example of the pixel unit 54.

As shown in FIG. 12, the pixel unit 54 includes the photodiode PD50 as a photoelectric transducer, a transfer transistor Tr51, an amplification transistor Tr52, a reset transistor Tr53, a select transistor Tr54, a switch SW50, and a capacity element C50. Here, the photodiode PD50 forms the light receiving element.

The anode of the photodiode PD50 is coupled to the ground voltage terminal GND. The transfer transistor Tr51 is provided between the cathode of the photodiode PD50 and the gate (input terminal) of the amplification transistor Tr52, and a transfer control signal (hereinafter, referred to as a transfer control signal Tx) from a transfer control signal line Tx is supplied to the gate. A floating diffusion capacity Cfd is formed on the side of the gate of the amplification transistor Tr52. The reset transistor Tr53 is provided between a power voltage terminal VDD and the gate of the amplification transistor Tr52, and a reset control signal (hereinafter, referred to as a reset control signal RST) from a reset control signal line RST is supplied to the gate. The amplification transistor Tr52 is provided between the power voltage terminal VDD and the output signal line OUT50. The select transistor Tr54 is provided in series with the amplification transistor Tr52 and a column select signal SEL is supplied to its gate.

The capacity element C50 is provided between the output signal line OUT50 and the ground voltage terminal GND. The switch SW50 is provided between the output signal line OUT50 and the capacity element C50 and a control signal CTL is supplied to a control terminal. Here, the capacity element C50 and the switch SW50 form a line memory LM50.

Figure 13:
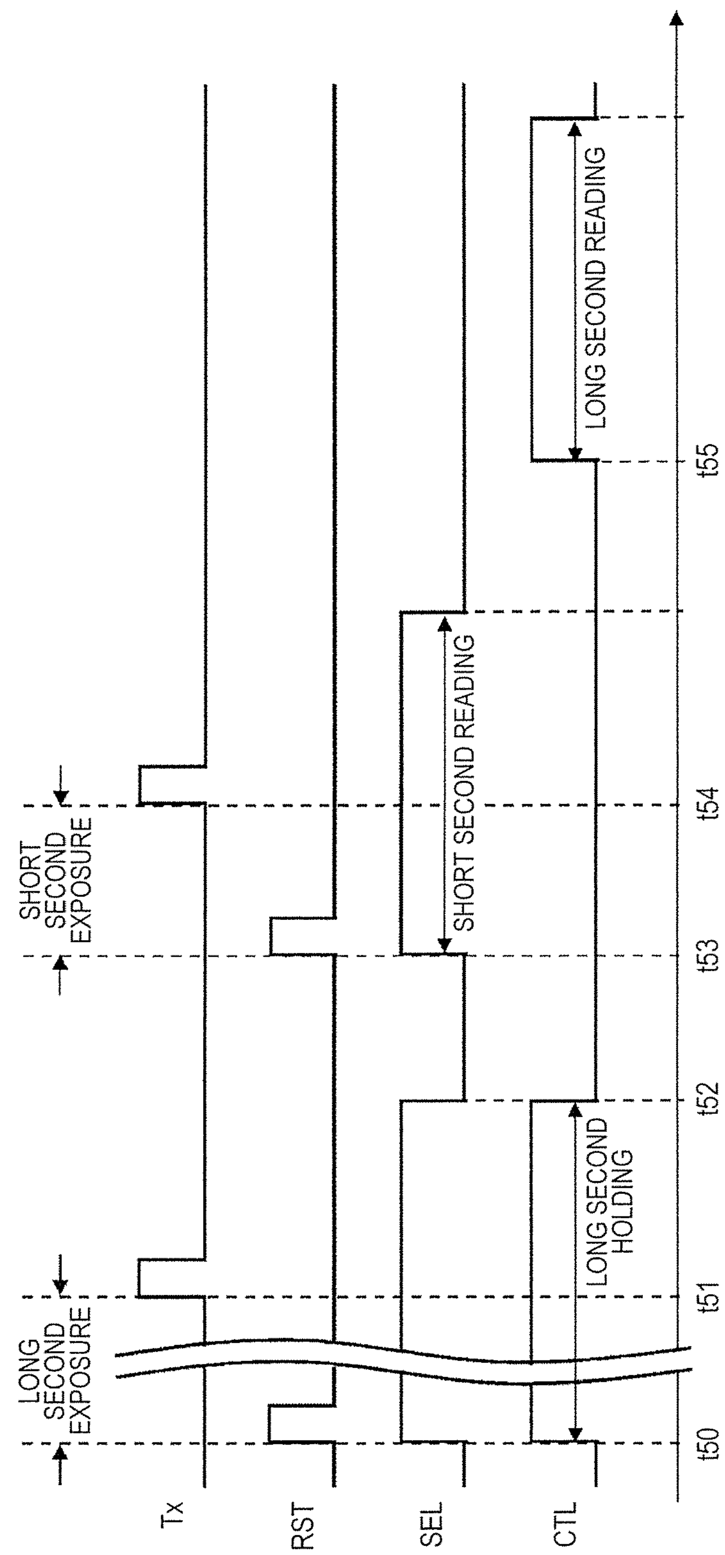
FIG. 13 is a timing chart showing an operation in the HDR exposure of the sensor in the conventional concept before arriving at the embodiments.

FIG. 13 is a timing chart showing the operation at the HDR exposure time of the sensor 52.

As shown in FIG. 13, at first, the column select signal SEL and the control signal CTL are turned active hence to turn on the select transistor Tr54 and the switch SW50. According to an active pulse (temporarily active state) of the reset control signal RST, the reset transistor Tr53 is temporarily turned on (at the time t50). The floating diffusion capacity Cfd is initialized with the accumulated electric charges released.

At this point, the long second exposure of the photodiode PD50 by the incident light through the microlens starts (at the time t50).

Then, after the exposure time for the long second exposure, the transfer transistor Tr51 is temporarily turned on according to the active pulse of the transfer control signal Tx (at the time t51). The electric charges accumulated in the photodiode PD50 through the exposure are transferred to the gate of the amplification transistor Tr52 through the transfer transistor Tr51, and accumulated in the floating diffusion capacity Cfd. The amplification transistor Tr52 amplifies the voltage of the floating diffusion capacity Cfd and outputs the above as the pixel signal PS1 to the output signal line OUT50 (at the time t51). In short, the pixel signal PS1 obtained through the long second exposure is read.

Here, the pixel signal PS1 obtained through the long second exposure is stored in the line memory LM50 (at the time t52).

Then, the column select signal SEL is turned active and the control signal CTL is turned inactive, hence to turn on the select transistor Tr54 and turn off the switch SW50 (at the time t53). According to the active pulse of the reset control signal RST, the reset transistor Tr53 is temporarily turned on again (at the time t53). The floating diffusion capacity Cfd is initialized with the accumulated electric charges released.

At this point, the short second exposure of the photodiode PD50 by the incident light through the microlens starts (at the time t53).

After the exposure time for the short second exposure, the transfer transistor Tr51 is temporarily turned on (at the time t54) according to the active pulse of the transfer control signal Tx. The electric charges accumulated in the photodiode PD50 through the exposure are transferred to the gate of the amplification transistor Tr52 through the transfer transistor Tr51 and accumulated in the floating diffusion capacity Cfd. The amplification transistor Tr52 amplifies the voltage of the floating diffusion capacity Cfd and outputs the above as the pixel signal PS2 to the output signal line OUT50 (at the time t54). In short, the pixel signal PS2 obtained through the short second exposure is read.

Here, at the time of reading the pixel signal PS2 (later than the time t54), the pixel signal PS1 stored in the line memory LM50 is also read (later than the time t55), in order to read the pixel signal obtained by compositing the pixel signals PS1 and PS2 from the output signal line OUT50. The plural pixel signals read from the plural pixel units 54 forming the pixel array 523 are externally output as the image data Dout. According to this, the HDR composition is performed.

In the structure of the sensor 52, however, each of the pixel units 54 creates the pixel signal PS1 to be obtained through the long second exposure, and then creates the pixel signal PS2 to be obtained through the short second exposure; therefore, the frame rate is reduced to a half compared with the case of not performing the HDR composition. As the result, for example, an image of a high speed moving object cannot be taken at a high precision.

Therefore, each pixel unit is provided with two photoelectric transducers as for one microlens; one photoelectric transducer is used for performing the long second exposure and the other is used for performing the short second exposure, both in parallel; as the result, there can be found the sensor 12 according to the first embodiment, which can suppress the reduction of the frame rate without deteriorating the image quality.

(Sensor 12 According to the First Embodiment)

Figure 2:
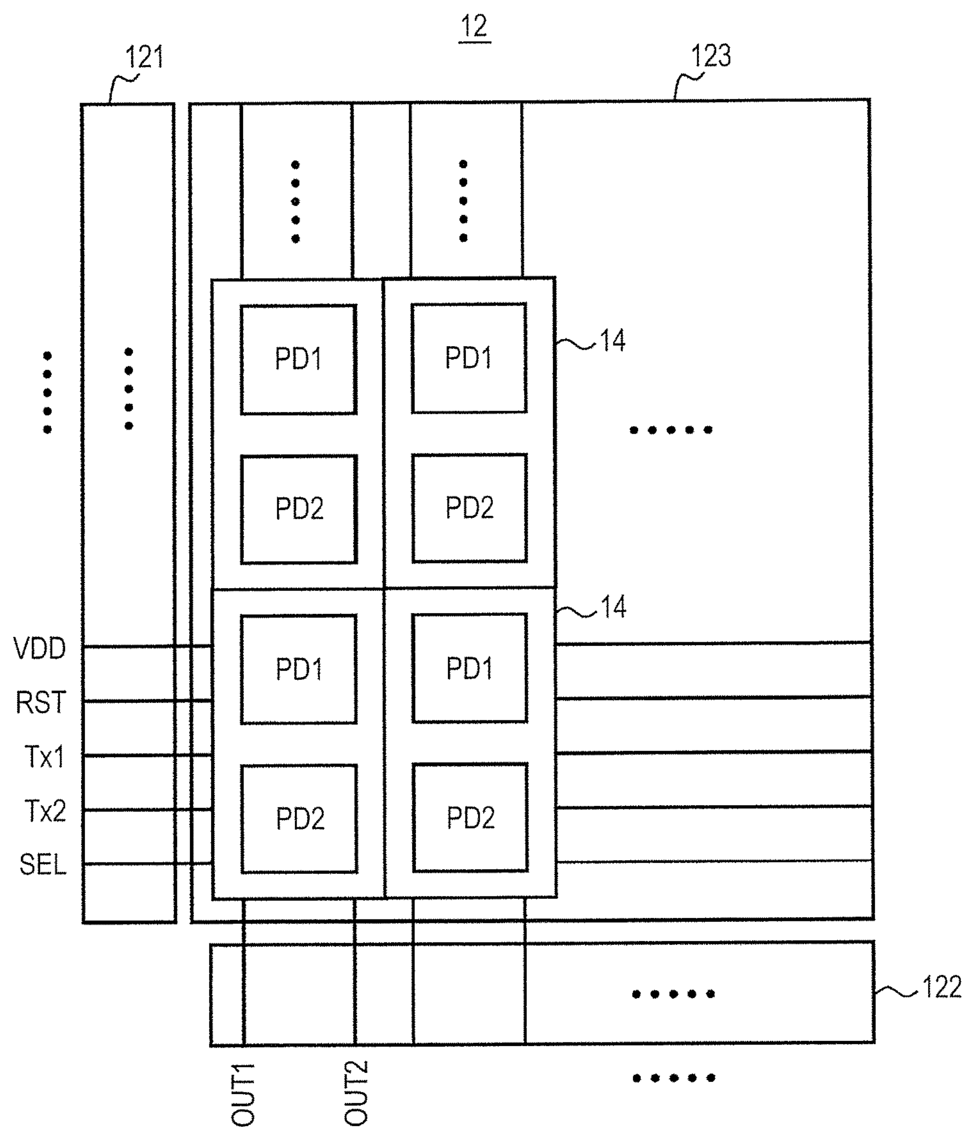
FIG. 2 is a schematic view showing one example of the layout of the sensor shown in FIG. 1.

FIG. 2 is a schematic view showing one example of the layout of the sensor 12. FIG. 2 shows the layout of a row controller 121, a column controller 122, and a pixel array 123 only, of the whole layout of the sensor 12.

As shown in FIG. 2, the pixel array 123 is formed by a plurality of pixel units 14 arranged in a lattice shape. The row controller 121 controls the activation states of the plural pixel units 14 arranged in a lattice shape, in every column. The column controller 122 reads a plurality of pixel signals read from the plural pixel units 14 arranged in the activated column by the row controller 121, in every row. The column controller 122 is provided with a select circuit of selecting one of the plural pixel signals and an output buffer of driving the pixel signal selected by the select circuit.

The plural pixel units 14 are provided with a plurality of microlens (not illustrated) correspondingly on their surfaces. Although the details will be described later, each of the pixel units 14 includes two photodiodes PD1 and PD2 forming the light receiving element, to output the pixel signal PS1 obtained by performing the long second exposure on the photodiode PD1 and the pixel signal PS2 obtained by performing the short second exposure on the photodiode PD2. The pixel signals PS1 of the plural pixel units 14 forming the pixel array 123 are output as the image data Do1 externally from the sensor and the pixel signals PS2 of the plural pixel units 14 are output as the image data Do2 externally from the sensor.

(Example of Pixel Unit 14)

Figure 3:
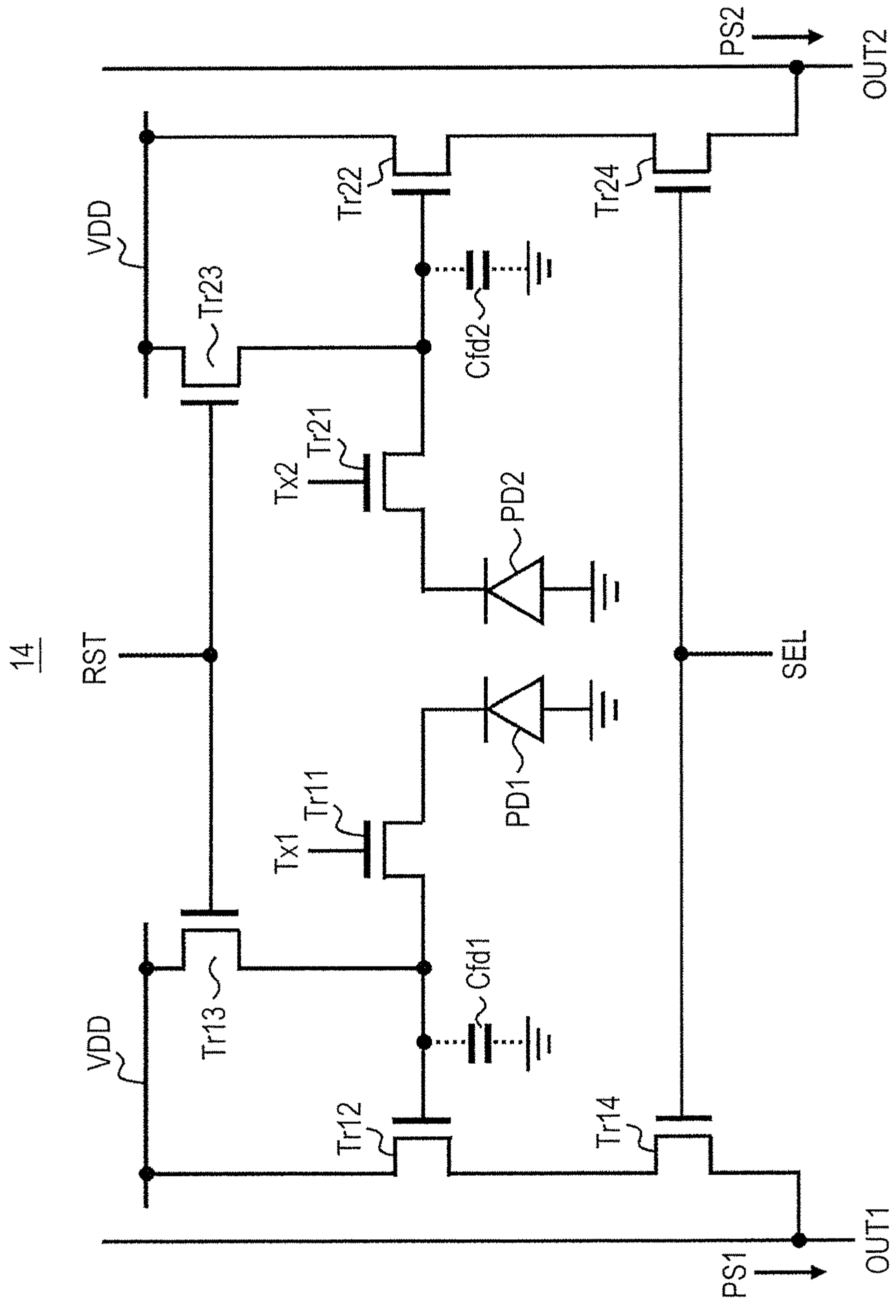
FIG. 3 is a circuit diagram showing an example of a pixel unit provided in the sensor shown in FIG. 1.

FIG. 3 is a circuit diagram showing an example of the pixel unit 14.

As shown in FIG. 3, the pixel unit 14 includes the photodiodes PD1 and PD2 as the photoelectric transducer, transfer transistors Tr11 and Tr21, amplification transistors Tr12 and Tr22, reset transistors Tr13 and Tr23, and select transistors Tr14 and Tr24. Here, the two photodiodes PD1 and PD2 form the light receiving element. Further, the photodiodes PD1 and PD2 are arranged adjacently and preferably, symmetrically with respect to the view from the common microlens.

The anode of the photodiode PD1 is coupled to the ground voltage terminal GND. The transfer transistor Tr11 is provided between the cathode of the photodiode PD1 and the gate (input terminal) of the amplification transistor Tr12, and the transfer control signal (hereinafter, referred to as the transfer control signal Tx1) from the transfer control signal line Tx1 is supplied to the gate. The floating diffusion capacity Cfd1 is famed on the side of the gate of the amplification transistor Tr12. The reset transistor Tr13 is provided between the power voltage terminal VDD and the gate of the amplification transistor Tr12, and the reset control signal (hereinafter, referred to as the reset control signal RST) from the reset control signal line RST is supplied to the gate. The amplification transistor Tr12 is provided between the power voltage terminal VDD and the output signal line OUT1. The select transistor Tr14 is provided in series with the amplification transistor Tr12 and the column select signal SEL is supplied to the gate.

The anode of the photodiode PD2 is coupled to the ground voltage terminal GND. The transfer transistor Tr21 is provided between the cathode of the photodiode PD2 and the gate (input terminal) of the amplification transistor Tr22 and the transfer control signal (hereinafter, referred to as the transfer control signal Tx2) from the transfer control signal line Tx2 is supplied to the gate. The floating diffusion capacity Cfd2 is formed on the side of the gate of the amplification transistor Tr22. The reset transistor Tr23 is provided between the power voltage terminal VDD and the gate of the amplification transistor Tr22, and the reset control signal RST is supplied to the gate. The amplification transistor Tr22 is provided between the power voltage terminal VDD and the output signal line OUT2. The select transistor Tr24 is provided in series with the amplification transistor Tr22, and the column select signal SEL is supplied to the gate.

Here, in the pixel unit 14, the reset transistors Tr13 and Tr23 are controlled by the common reset control signal RST and the select transistors Tr14 and Tr24 are controlled by the common column select signal SEL, while the transfer transistors Tr11 and Tr21 are controlled by the respective different transfer control signals Tx1 and Tx2. In the pixel unit 14, the photodiodes PD1 and PD2 are respectively provided with the individual output signal lines OUT1 and OUT2.

(Operation Example of Sensor 12)

Figure 4:
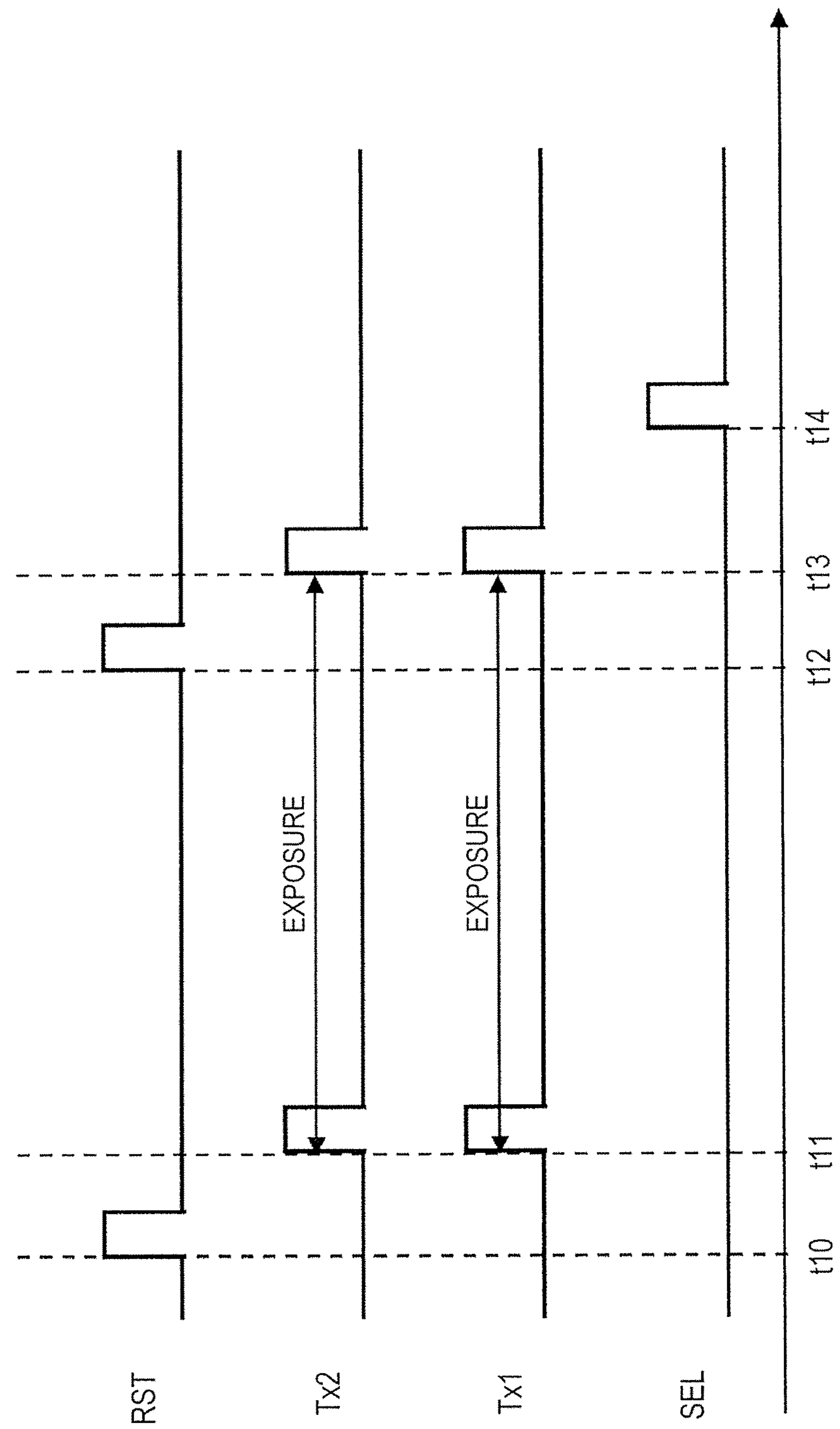
FIG. 4 is a timing chart showing an operation in the general exposure of the sensor shown in FIG. 1.

FIG. 4 is a timing chart showing the operation at the general exposure time of the sensor 12.

Figure 5:
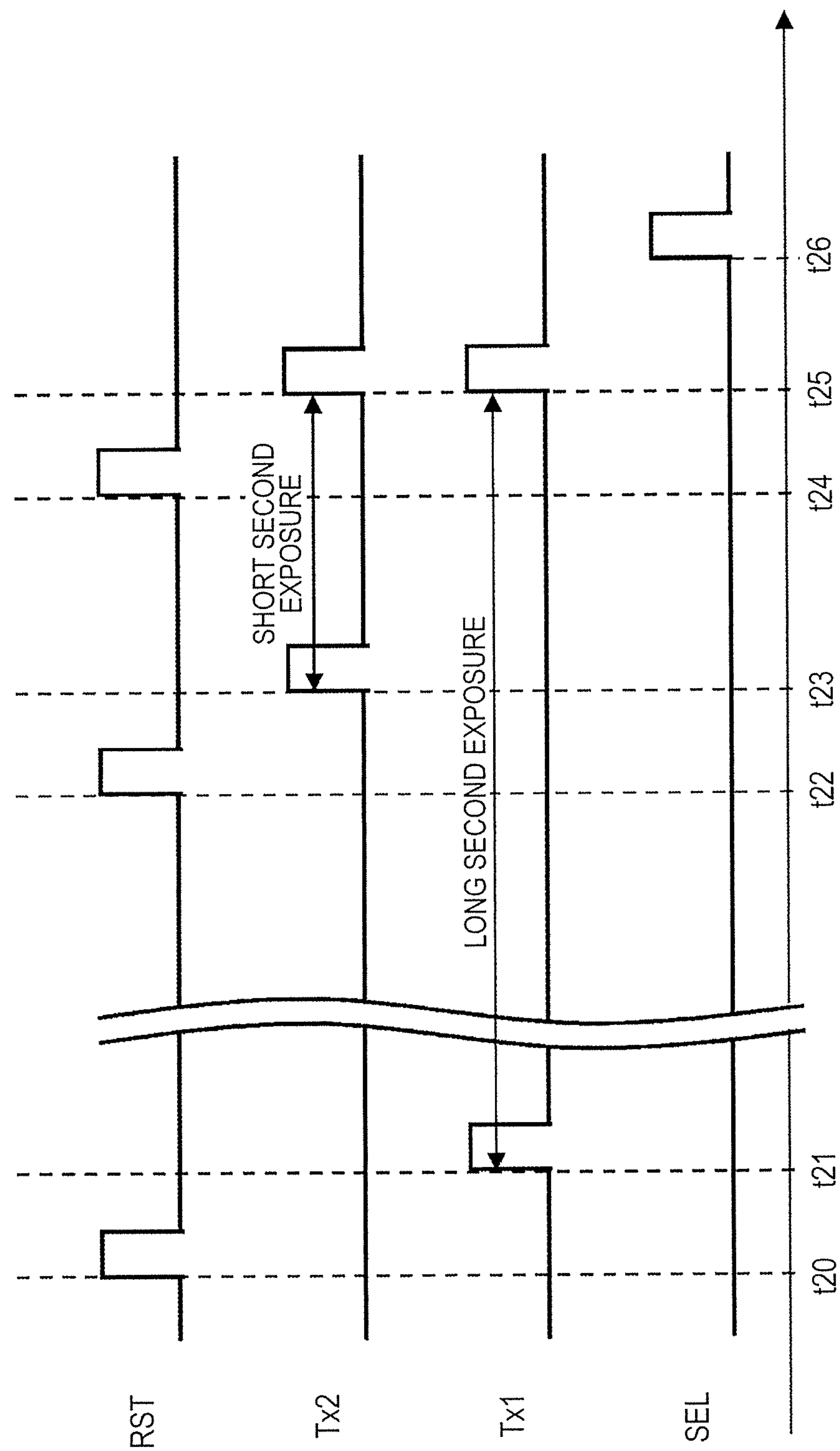
FIG. 5 is a timing chart showing an operation in HDR exposure of the sensor shown in FIG. 1.

FIG. 5 is a timing chart showing the operation at the HDR exposure time of the sensor 12.

At first, the exposure for autofocus (hereinafter, referred to as the general exposure) is performed.

In the general exposure, the reset transistors Tr13 and Tr23 are temporarily turned on according to the active pulse (temporarily active state) of the reset control signal RST (at the time t10). The floating diffusion capacities Cfd1 and Cfd2 are initialized with the accumulated electric charges released.

Then, the transfer transistors Tr11 and Tr21 are temporarily turned on according to the active pulses of the transfer control signals Tx1 and Tx2 (at the time t11). The photodiodes PD1 and PD2 are initialized with the electric charges transferred. Here, the exposure (general exposure) of the photodiodes PD1 and PD2 starts according to the incident light through the common microlens (at the time t11).

Just before the end of a predetermined exposure time required for the general exposure, the reset transistors Tr13 and Tr23 are temporarily turned on again according to the active pulse of the reset control signal RST (at the time t12). The floating diffusion capacities Cfd1 and Cfd2 are initialized with the electric charges released.

After the predetermined exposure time required for the general exposure, the transfer transistors Tr11 and Tr21 are temporarily turned on again according to the active pulses of the transfer control signals Tx1 and Tx2 (at the time t13). The electric charges accumulated in the photodiodes PD1 and PD2 through the exposure are respectively transferred to the gates of the amplification transistors Tr12 and Tr22 through the transfer transistors Tr11 and Tr21 and respectively accumulated in the floating diffusion capacities Cfd1 and Cfd2. The amplification transistor Tr12 amplifies the voltage of the floating diffusion capacity Cfd1 and outputs the above as the pixel signal PS1 to the output signal line OUT1. Further, the amplification transistor Tr22 amplifies the voltage of the floating diffusion capacity Cfd2 and outputs the above as the pixel signal PS2 to the output signal line OUT2.

Then, by activating the column select signal SEL, the select transistors Tr14 and Tr24 are turned on (at the time t14). According to this, the pixel signals PS1 and PS2 obtained through the general exposure for the predetermined exposure time are respectively read from the output signal lines OUT1 and OUT2 at once.

The plural pixel signals PS1 read from the plural pixel units 14 faulting the pixel array 123 are output as the image data Do1 externally from the sensor. The plural pixel signals PS2 read from the plural pixel units 14 are output as the image data Do2 externally from the sensor.

The both image data Do1 and Do2 is compared with each other, for example, in the composite circuit 15 provided in the signal processing circuit 13. When there is a difference of the light amount between the incident light to the photodiode PD1 and the incident light to the photodiode PD2 as the comparison result, the microcomputer 16 outputs the AF information for positioning the lens 11 so as to equalize the both light amounts. This AF information is fed back to the actuator (not illustrated) which moves the lens 11 and the actuator moves the lens 11 according to the fed back AF information.

Thus, the autofocus of the camera system 1 is performed. In the case of performing the focus by hands, the autofocus may be omitted.

Continuously, the exposure for the HDR composition (hereinafter, referred to as the HDR exposure) is performed.

In the HDR exposure, at first, the reset transistor Tr13 (and Tr23) is temporarily turned on according to the active pulse of the reset control signal RST (at the time t20). The floating diffusion capacity Cfd1 is initialized with the accumulated electric charges released.

Then, the transfer transistor Tr11 is temporarily turned on according to the active pulse of the transfer control signal Tx1 (at the time t21). The photodiode PD1 is initialized with the electric charges transferred. Here, the long second exposure of the photodiode PD1 starts according to the incident light through the microlens (at the time t21).

Before the active pulse of the transfer control signal Tx2, the reset transistor Tr23 (and Tr13) is temporarily turned on according to the active pulse of the reset control signal RST (at the time t22). The floating diffusion capacity Cfd2 is initialized with the accumulated electric charges released.

Then, the transfer transistor Tr21 is temporarily turned on according to the active pulse of the transfer control signal Tx2 (at the time t23). The photodiode PD2 is initialized with the electric charges transferred. Here, the short second exposure of the photodiode PD2 starts according to the incident light through the microlens (at the time t23).

The long second exposure of the photodiode PD1 and the short second exposure of the photodiode PD2 are performed in parallel. The starting time of the short second exposure is set so that the ending time of the short second exposure may be at the same time as the ending time of the long second exposure.

Just before the end of the respective exposure times of the long second exposure and the short second exposure performed in parallel, the reset transistors Tr13 and Tr23 are temporarily turned on according to the active pulse of the reset control signal RST (at the time t24). The floating diffusion capacities Cfd1 and Cfd2 are initialized with the accumulated electric charges released.

Then, after the respective exposure times for the long second exposure and the short second exposure performed in parallel, the transfer transistors Tr11 and Tr21 are temporarily turned on again according to the active pulses of the transfer control signals Tx1 and Tx2 (at the time t25). The electric charges accumulated in the photodiodes PD1 and PD2 through the exposure are transferred to the gates of the amplification transistors Tr12 and Tr22 through the transfer transistors Tr11 and Tr21 and accumulated in the floating diffusion capacities Cfd1 and Cfd2.

Here, the amplification transistor Tr12 amplifies the voltage of the floating diffusion capacity Cfd1 and outputs the pixel signal PS1 to the output signal line OUT1. The amplification transistor Tr22 amplifies the voltage of the floating diffusion capacity Cfd2 and outputs the pixel signal PS2 to the output signal line OUT2.

Then, by activating the row select signal SEL, the select transistors Tr14 and Tr24 are turned on (at the time t26). According to this, the pixel signal PS1 obtained through the long second exposure and the pixel signal PS2 obtained through the short second exposure are respectively read from the output signal lines OUT1 and OUT2 at once.

The plural pixel signals PS1 read from the plural pixel units 14 faulting the pixel array 123 are output as the image data Do1 externally from the sensor. The plural pixel signals PS2 read from the plural pixel units 14 are output as the image data Do2 externally from the sensor. The both image data Do1 and Do2 is composited together as the image data Dout by the composite circuit 15 within the signal processing circuit 13.

The HDR composition by the camera system 1 is thus performed. The image data Dout obtained by the HDR composition is displayed on a monitor and stored in a storing device.

As mentioned above, in the sensor 12 and the camera system 1 having the sensor 12, each of the pixel units 14 includes the two photodiodes PD1 and PD2 as for one microlens; at the HDR composition time, one photodiode PD1 is used for performing the long second exposure and the other photodiode PD2 is used for performing the short second exposure, both in parallel. The sensor 12 and the camera system 1 having the sensor 12 can suppress a reduction of the frame rate without deteriorating the image quality. The period for the long second exposure and the period for the short second exposure can be aligned; therefore, the image data Dout with a high precision can be generated.

Further, in the sensor 12 and the camera system 1 having the sensor 12, the pixel signals P1 and P2 obtained through the long second exposure and the short second exposure are read simultaneously from the pixel units 14; therefore, there is no need to provide a line memory for temporarily storing the pixel signals previously obtained by the long second exposure or the short second exposure. As the result, the sensor 12 and the camera system 1 having the above according to the embodiment can suppress an increase in the circuit size.

Figure 6:
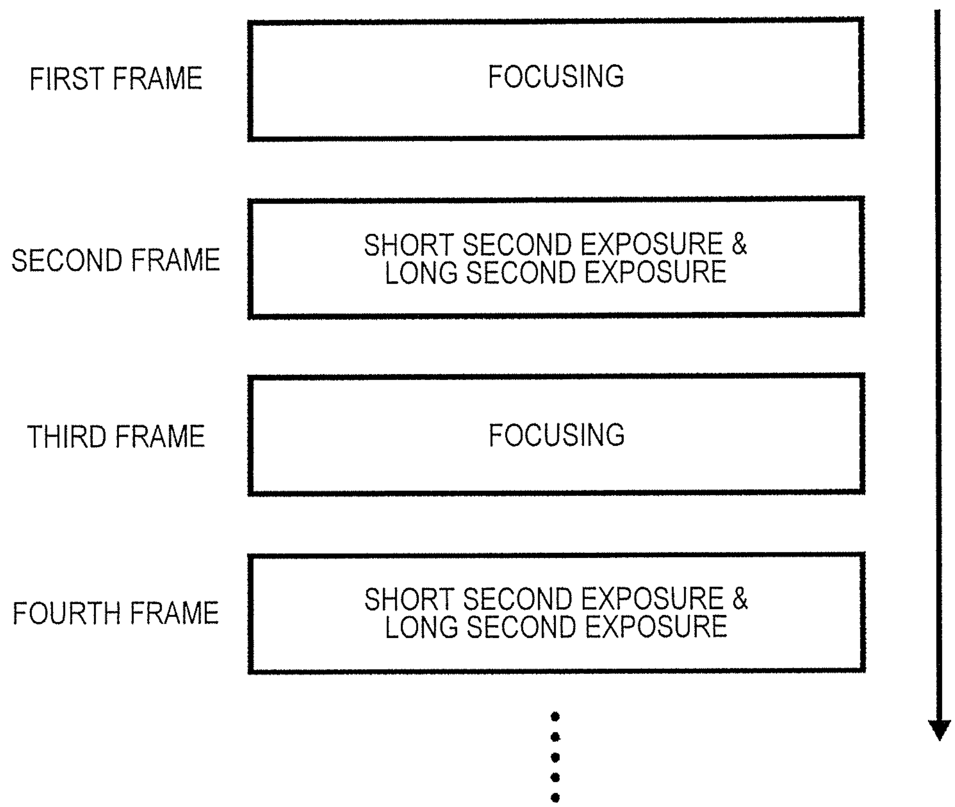
FIG. 6 is a view for describing one example of the operation of the camera system shown in FIG. 1.

The embodiment has been described in the case of performing the focusing process (autofocus) in the first frame and performing the short second exposure and the long second exposure in parallel in the second frame and the later; however, this is not restrictive. For example, as shown in FIG. 6, the focusing processing and the parallel processing of the short second exposure and the long second exposure may be alternately performed in every one frame. Alternatively, the parallel processing of the short second exposure and the long second exposure is basically repeated and the focusing processing may be inserted at a predetermined cycle.

(Modified Example of Camera System 1)

Figure 7:
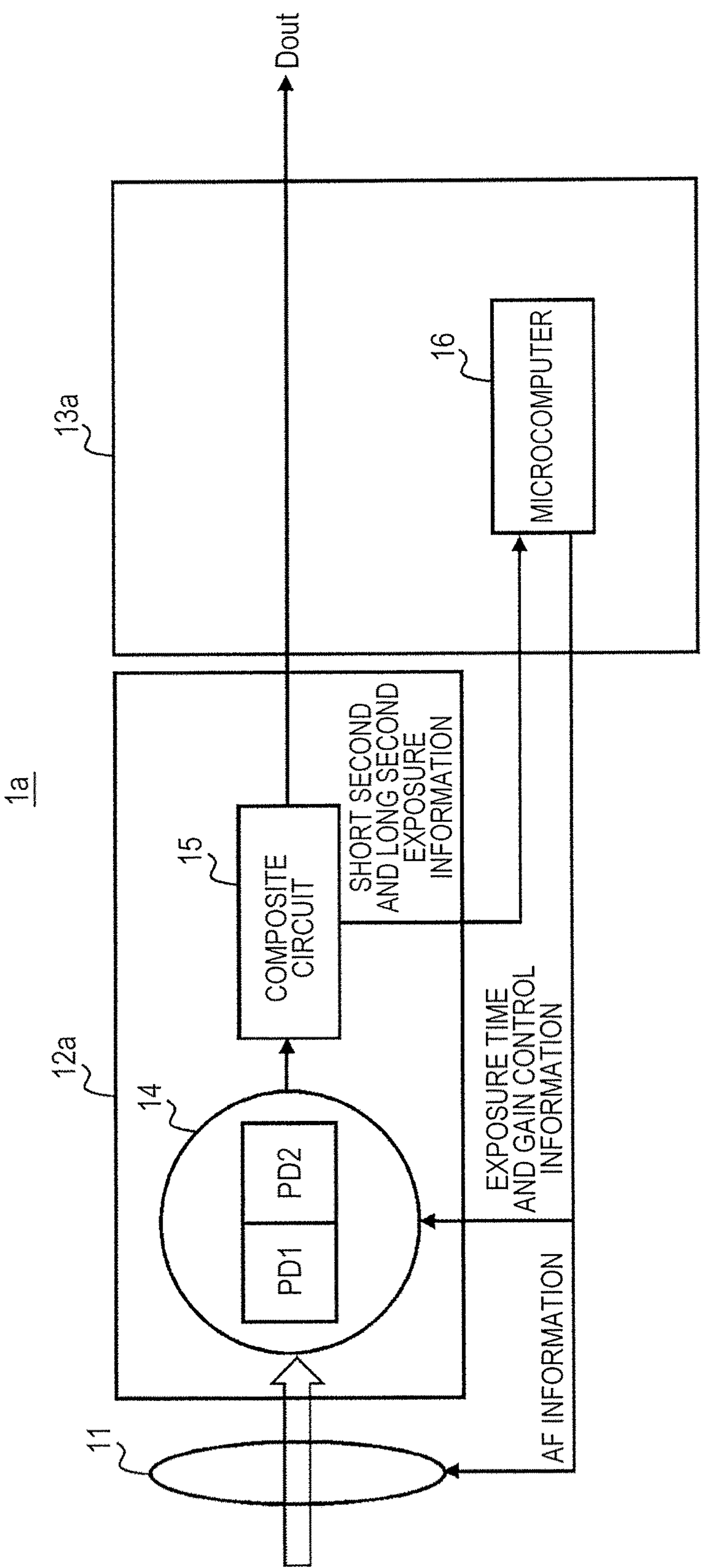
FIG. 7 is a block diagram showing a modified example of the camera system shown in FIG. 1.

FIG. 7 is a block diagram showing a modified example of the camera system 1 as a camera system 1*a*. In the camera system 1*a*, the position of the composite circuit 15 is different from that in the camera system 1.

Specifically, in the camera system 1, the composite circuit 15 is provided in the signal processing circuit 13; while in the camera system 1*a*, the composite circuit 15 is provided in the sensor 12 instead of the signal processing circuit 13. Hereinafter, the sensor 12 and the signal processing circuit 13 in the camera system 1*a* are respectively referred to as a sensor 12*a* and a signal processing circuit 13*a*. The other structure and operation of the camera system 1*a* are the same as those of the camera system 1; therefore, the description is omitted.

The camera system 1*a* performs the HDR composition within the sensor 12*a* and therefore, the signal processing circuit 13*a* does not have to include a special circuit for the HDR composition. In short, a general signal processing circuit can be used for the signal processing circuit 13*a*.

Second Embodiment

Figure 8:
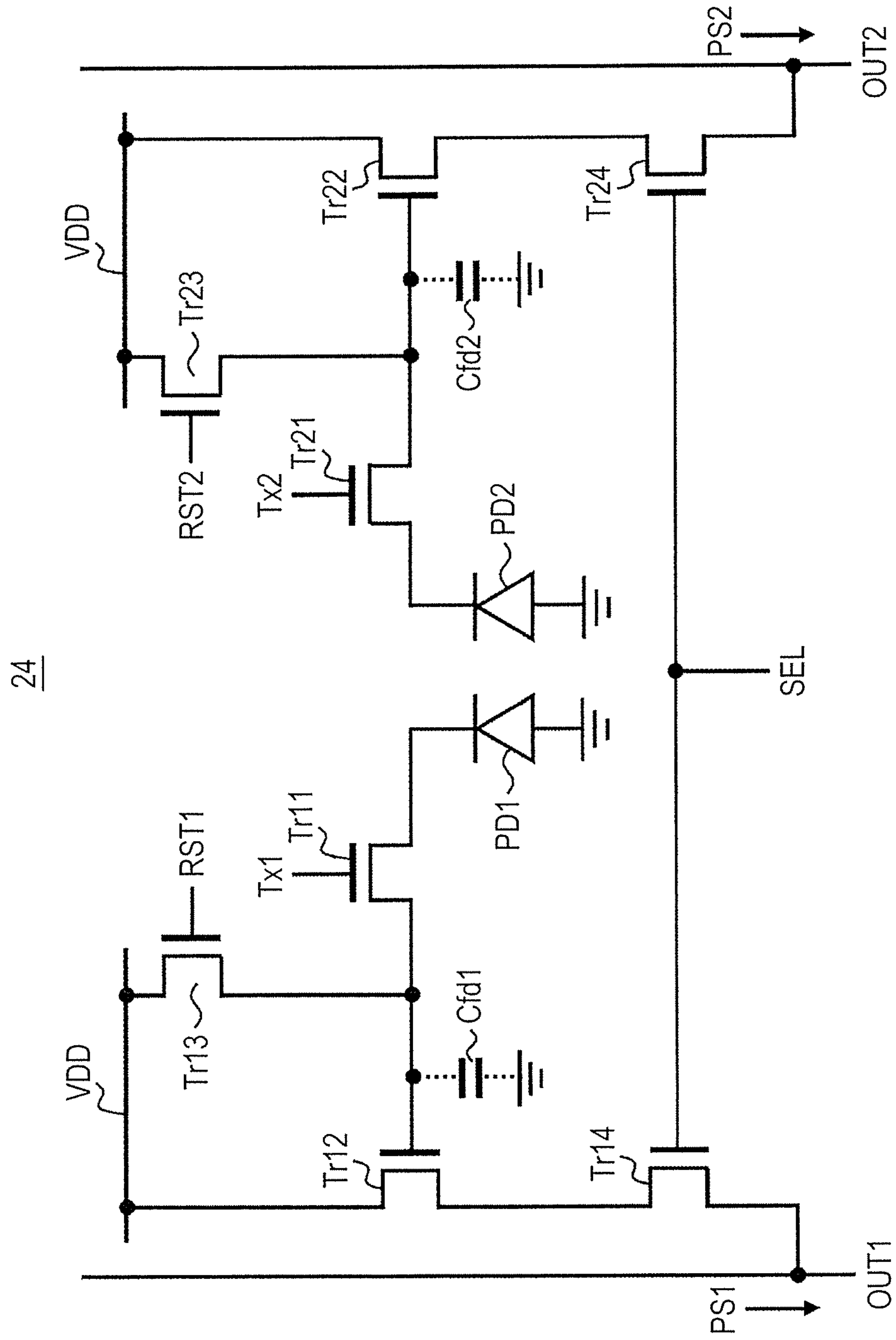
FIG. 8 is a circuit diagram showing an example of a pixel unit provided in a sensor according to a second embodiment.

FIG. 8 is a circuit diagram showing an example of a pixel unit 24 provided in a sensor 22 according to a second embodiment. The sensor according to the embodiment sets the intermediate time of the long second exposure performed by using one photoelectric transducer to be as close as possible to the intermediate time of the short second exposure performed by using the other photoelectric transducer. According to this, the sensor and the camera system having the sensor can generate image data with the higher precision than the first embodiment. Hereinafter, the details will be described.

In the pixel unit 14 shown in FIG. 3, the reset transistors Tr13 and Tr23 are controlled by the common reset control signal RST; while, in the pixel unit 24 shown in FIG. 8, the reset transistors Tr13 and Tr23 are respectively controlled by the reset control signals RST1 and RST2 from the different reset control signal lines. The other structure of the pixel unit 24 and the sensor 22 is the same as that of the pixel unit 14 and the sensor 12; therefore, the description is omitted.

(Operation Example of Sensor 22)

Figure 9:
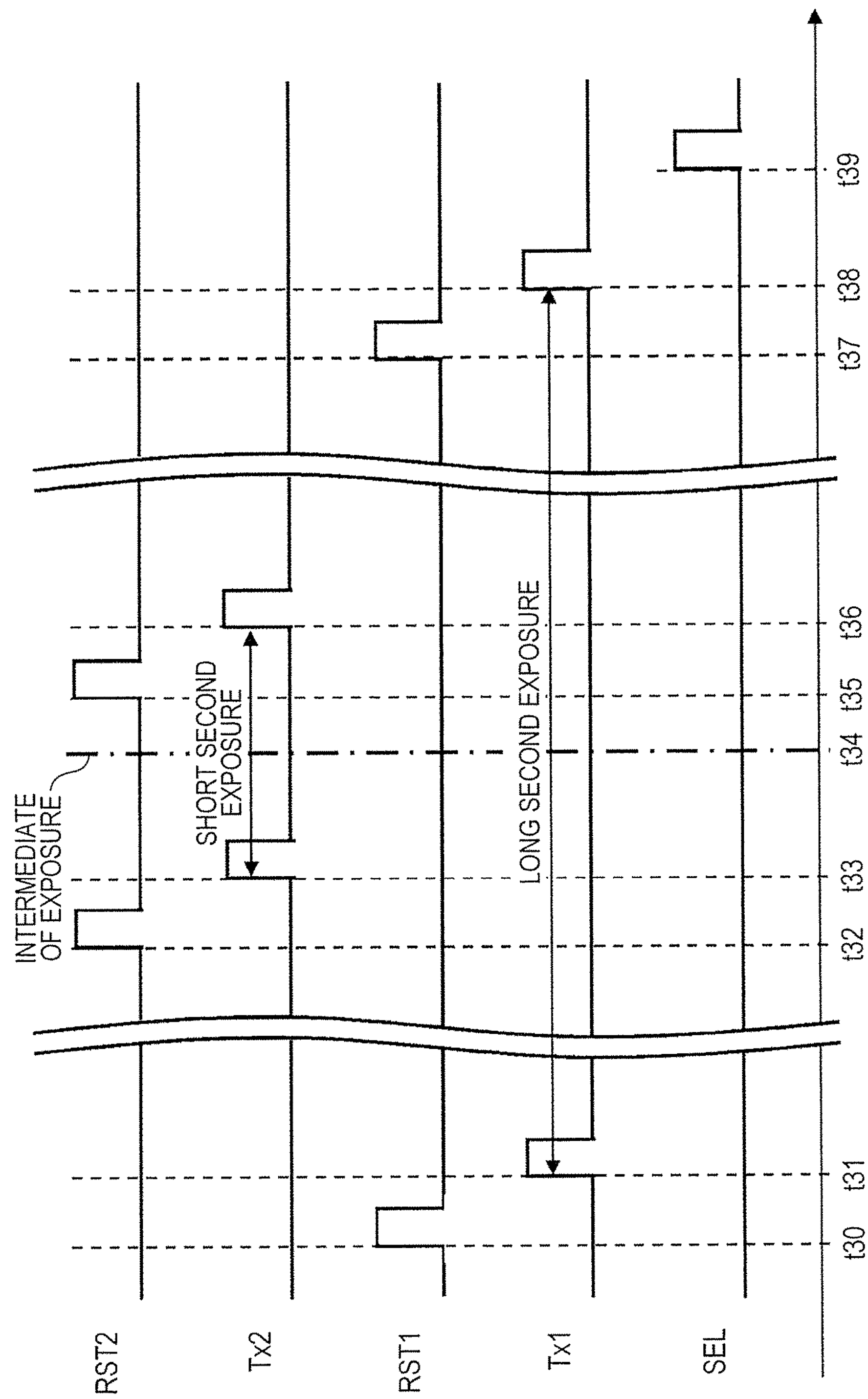
FIG. 9 is a timing chart showing an operation in HDR exposure of the sensor according to the second embodiment.

FIG. 9 is a timing chart showing the operation of the sensor 22 at the HDR exposure time.

Before performing the HDR exposure, the general exposure for autofocus is performed depending on the necessity. The general exposure is the same as that of the pixel unit 14 except that the reset control signals RST1 and RST2 are operated similarly to the reset control signal RST; therefore, the description is omitted.

Continuously, the HDR exposure is performed. In the HDR exposure, at first, the reset transistor Tr13 is temporarily turned on according to the active pulse (temporarily active state) of the reset control signal RST1 (at the time t30). The floating diffusion capacity Cfd1 is initialized with the accumulated electric charges released.

Then, the transfer transistor Tr11 is temporarily turned on according to the active pulse of the transfer control signal Tx1 (at the time t31). The photodiode PD1 is initialized with the electric charges transferred. Here, the long second exposure of the photodiode PD1 starts according to the incident light through the microlens (at the time t31).

Then, the reset transistor Tr23 is temporarily turned on according to the active pulse of the reset control signal RST2 (at the time t32). The floating diffusion capacity Cfd2 is initialized with the accumulated electric charges released.

Then, the transfer transistor Tr21 is temporarily turned on according to the active pulse of the transfer control signal Tx2 (at the time t33). The photodiode PD2 is initialized with the electric charges transferred. Here, the short second exposure of the photodiode PD2 starts according to the incident light through the microlens (at the time t33).

The long second exposure of the photodiode PD1 and the short second exposure of the photodiode PD2 are performed in parallel. The starting time of the short second exposure is set at such a time that the intermediate time of the short second exposure may be identical to the intermediate time of the long second exposure (at the time t34). The intermediate time of the short second exposure can be closer to that of the long second exposure.

Just before the end of the exposure time for the short second exposure, the reset transistor Tr23 is temporarily turned on again according to the active pulse of the reset control signal RST2 (at the time t35). The floating diffusion capacity Cfd2 is initialized with the accumulated electric charges released.

After the exposure time for the short second exposure, the transfer transistor Tr21 is temporarily turned on again according to the active pulse of the transfer control signal Tx2 (at the time t36). The electric charges accumulated in the photodiode PD2 through the exposure are transferred to the gate of the amplification transistor Tr22 through the transfer transistor Tr21 and accumulated in the floating diffusion capacity Cfd2. The amplification transistor Tr22 amplifies the voltage of the floating diffusion capacity Cfd2 outputs the pixel signal PS2 to the output signal line OUT2.

Just before the end of the exposure time for the long second exposure, the reset transistor Tr13 is temporarily turned on again according to the active pulse of the reset control signal RST1 (at the time t37). The floating diffusion capacity Cfd1 is initialized with the accumulated electric charges released.

After the exposure time for the long second exposure, the transfer transistor Tr11 is temporarily turned on again according to the active pulse of the transfer control signal Tx1 (at the time t38). The electric charges accumulated in the photodiode PD1 through the exposure are transferred to the gate of the amplification transistor Tr12 through the transfer transistor Tr11 and accumulated in the floating diffusion capacity Cfd1. The amplification transistor Tr12 amplifies the voltage of the floating diffusion capacity Cfd1 and outputs the pixel signal PS1 to the output signal line OUT1.

Then, the select transistors Tr14 and Tr24 are turned on by activating the row select signal SEL (at the time t39). The pixel signal PS1 obtained through the long second exposure and the pixel signal PS2 obtained through the short second exposure are respectively read from the output signal lines OUT1 and OUT2 at once.

The plural pixel signals PS1 read from the plural pixel units 24 forming the pixel array are output as the image data Do1 externally from the sensor. The plural pixel signals PS2 read from the plural pixel units 24 are output as the image data Do2 externally from the sensor. The both image data Do1 and Do2 is composited together by the composite circuit 15 as the image data Dout. Thus, the HDR composition is performed. The image data Dout obtained through the HDR composition is displayed on a monitor or stored in a storing device.

As mentioned above, the sensor 22 and the camera system having the sensor 22 can achieve the same effect as the sensor 12 and the camera system 1 having the sensor 12 according to the first embodiment. Further, the sensor 22 and the camera system having the sensor 22 can suppress a phase deviation of the pixel signals PS1 and PS2 by making the intermediate time of the long second exposure in agreement with the intermediate time of the short second exposure, hence to generate the image data Dout with a higher precision.

In the second embodiment, however, the correlated double sampling can be performed on only the long second exposure; while, in the first embodiment, the correlated double sampling can be performed on both the short second exposure and the long second exposure advantageously.

Third Embodiment

In this embodiment, the other operational example of the sensor 12 having been described in the first embodiment will be described. In the embodiment, the general exposure for the autofocus and the long second exposure for the HDR composition are performed at once. Hereinafter, the details will be described.

(Operational Example of Sensor 12)

Figure 10:
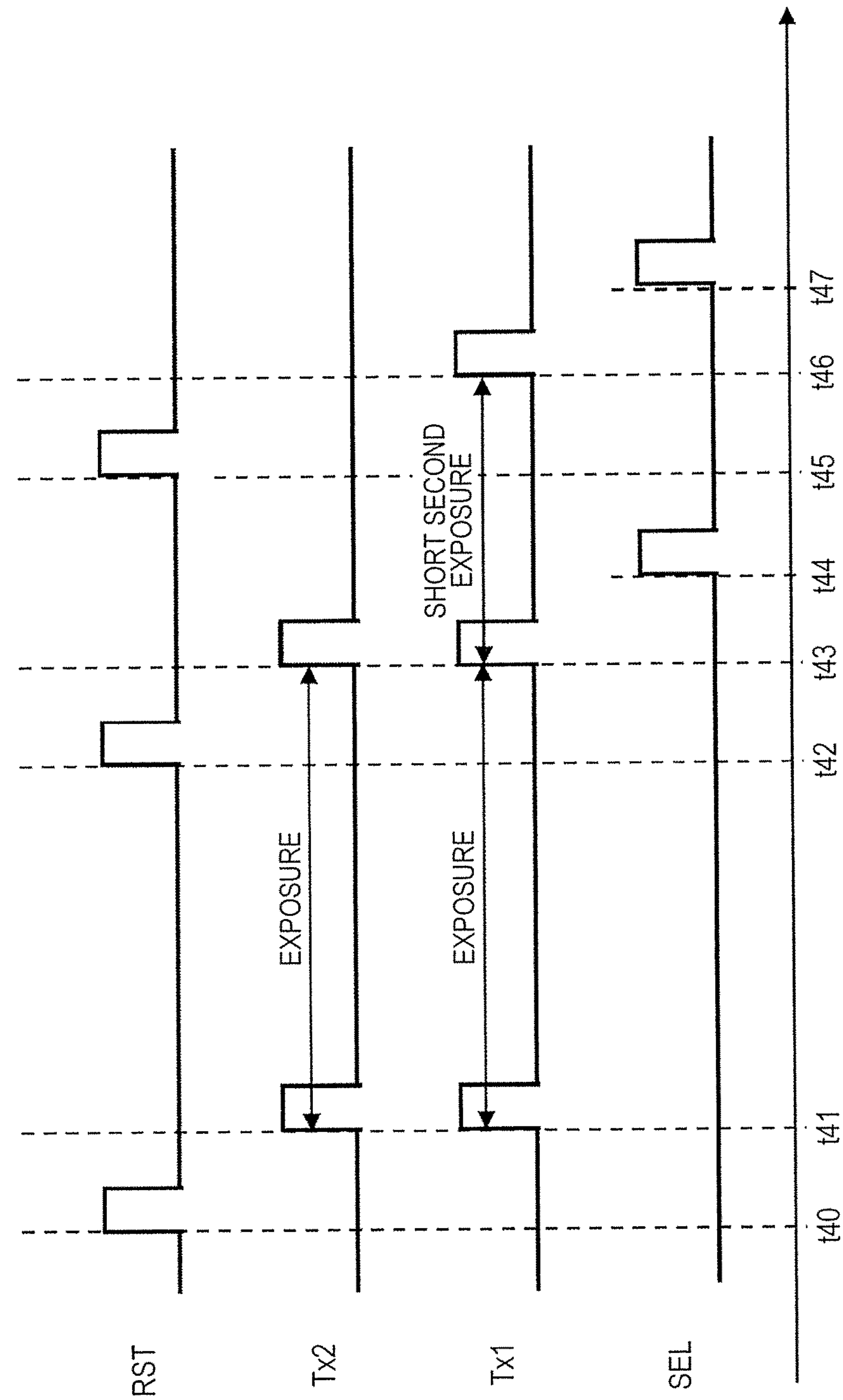
FIG. 10 is a timing chart showing an operation of a sensor according to a third embodiment.

FIG. 10 is a timing chart showing the operation of the sensor 12 according to the third embodiment.

In the example of FIG. 10, the general exposure for the autofocus and the long second exposure for the HDR composition are performed at once.

The reset transistors Tr13 and Tr23 are temporarily turned on according to the active pulse (temporarily active state) of the reset control signal RST (at the time t40). The floating diffusion capacities Cfd1 and Cfd2 are initialized with the accumulated electric charges released.

Then, the transfer transistor Tr11 is temporarily turned on according to the active pulses of the transfer control signals Tx1 and Tx2 (at the time t41). The photodiodes PD1 and PD2 are initialized with the electric charges transferred. Here, the exposure of the photodiodes PD1 and PD2 starts according to the incident light through the microlens (at the time t41).

Just before the end of a predetermined exposure time, the reset transistors Tr13 and Tr23 are temporarily turned on again according to the active pulse of the reset control signal RST (at the time t42). The floating diffusion capacities Cfd1 and Cfd2 are initialized with the accumulated electric charges released.

After the predetermined exposure time, the transfer transistors Tr11 and Tr21 are temporarily turned on again according to the active pulses of the transfer control signals Tx1 and Tx2 (at the time t43). Here, the predetermined exposure time means a half of the exposure time when only one photodiode is used for performing the long second exposure.

In short, when the total sum of the respective exposure times of the two photodiodes PD1 and PD2 arrives at the exposure time for the long second exposure by use of the one photodiode PD1, the transfer transistors Tr11 and Tr21 are temporarily turned on again according to the active pulses of the transfer control signals Tx1 and Tx2 (at the time t43).

According to this, the electric charges accumulated in the photodiodes PD1 and PD2 through the exposure are respectively transferred to the gates of the amplification transistors Tr12 and Tr22 through the transfer transistors Tr11 and Tr21 and accumulated in the floating diffusion capacities Cfd1 and Cfd2. The amplification transistors Tr12 and Tr22 respectively amplify the voltages of the floating diffusion capacities Cfd1 and Cfd2 and respectively output the pixel signals PS1 and PS2 to the output signal lines OUT1 and OUT2.

Then, the select transistors Tr14 and Tr24 are turned on by activating the row select signal SEL (at the time t44). According to this, the pixel signals PS1 and PS2 are respectively read from the output signal lines OUT1 and OUT2 at once.

The plural pixel signals PS1 read from the plural pixel units 14 faulting the pixel array 123 are output as the image data Do1 externally from the sensor. The plural pixel signals PS2 read from the plural pixel units 14 are output as the image data Do2 externally from the sensor.

According to the autofocus processing having been described in the first embodiment, the autofocus is performed based on the comparison results of the image data Do1 and Do2. Further, by compositing the image data Do1 and Do2 together, the image data obtained through the long second exposure is also created. According to this, the general exposure for the autofocus and the long second exposure for the HDR composition are performed at once.

According to the active pulse of the transfer control signal Tx1 at the time t43, the short second exposure of the photodiode PD2 newly starts (at the time t43).

Just before the end of the exposure time for the short second exposure, the reset transistor Tr13 is temporarily turned on according to the active pulse of the reset control signal RST (at the time t45). The floating diffusion capacity Cfd1 is initialized with the accumulated electric charges released.

After the exposure time for the short second exposure, the transfer transistor Tr11 is temporarily turned on again according to the active pulse of the transfer control signal Tx1 (at the time t46). The electric charges accumulated in the photodiode PD1 through the exposure are transferred to the gate of the amplification transistor Tr12 through the transfer transistor Tr11 and accumulated in the floating diffusion capacity Cfd1. The amplification transistor Tr12 amplifies the voltage of the floating diffusion capacity Cfd1 and outputs the pixel signal PS1 to the output signal line OUT1.

Then, the select transistors Tr14 is turned on by activating the row select signal SEL (at the time t47). According to this, the pixel signal PS1 obtained through the short second exposure is read from the output signal line OUT1.

The plural pixel signals PS1 read from the plural pixel units 14 forming the pixel array 123 are output as the image data Do1 externally from the sensor. The image data Do1 obtained through the short second exposure and the previously output image data obtained through the long second exposure are composited by the composite circuit 15 as the image data Dout. Thus, the HDR composition is performed.

As mentioned above, the sensor 12 and the camera system 1 having the sensor 12 perform the general exposure for the autofocus and the long second exposure for the HDR composition at once. Therefore, the autofocus and the HDR composition can be realized within one frame. Alternatively, the focus adjustment processing can be built in without disturbing the repetition of the exposure for the HDR composition. In the long second exposure, the electric charges accumulated in the photodiodes PD1 and PD2 can be totaled and output, hence to make it possible to image a dark part of an object to be taken sharply.

As set forth hereinabove, according to the sensor and the camera system having the above according to the first to the third embodiment, each pixel unit includes two photodiodes PD1 and PD2 as for one microlens and the photodiodes PD1 and PD2 perform the exposures in parallel. As the result, the sensor and the camera system having the above according to the first to the third embodiment can suppress the reduction of the frame rate without deteriorating the image quality. The period for the long second exposure (time zone) and the period for the short second exposure (time zone) can be aligned, hence to create the image data Dout with a high precision.

As mentioned above, although the invention made by the inventor et al. has been described specifically based on the embodiments, it is not restricted to the above mentioned embodiments but it is needless to say that various modifications are possible without departing from the spirit.

For example, in the semiconductor device according to the above embodiments, the conductivity type (p-type or n-type) of the semiconductor substrate, the semiconductor layer, and the diffusion layer (diffusion area) may be inverted. When one of the n-type and p-type is defined as a first conductivity type and the other is defined as a second conductivity type, the first conductivity type may be the p-type and the second conductivity type may be the n-type or on the contrary, the first conductivity type may be the n-type and the second conductivity type may be the p-type.

What is claimed is:

1. An imaging device comprising:

a first photoelectric transducer that receives an incident light through a microlens;

a second photoelectric transducer that receives an incident light through the microlens common with the first photoelectric transducer;

a first transfer transistor that transfers electric charges output from the first photoelectric transducer when a first transfer control signal becomes active;

a second transfer transistor that transfers electric charges output from the second photoelectric transducer when a second transfer control signal different from the first transfer control signal becomes active;

a first output signal line that transmits a first output voltage depending on the electric charges transferred by the first transfer transistor, and a second output signal line that transmits a second output voltage depending on the electric charges transferred by the second transfer transistor, wherein the first photoelectric transducer performs a long second exposure, and the second photoelectric transducer performs a short second exposure, the second photoelectric transducer starts performing the short second exposure after the first photoelectric transducer starts performing the long second exposure, and the long second exposure and the short second exposure are performed in parallel with each other.

2. The device according to claim 1, further comprising:

a first transfer control signal line that transmits the first transfer control signal, and a second transfer control signal line that transmits the second transfer control signal.

3. The device according to claim 1, further comprising:

a first amplification transistor that amplifies a first voltage generated by the electric charges transferred by the first transfer transistor and outputs the first output voltage to the first output signal line, and a second amplification transistor that amplifies a second voltage generated by the electric charges transferred by the second transfer transistor and outputs the second output voltage to the second output signal line.

4. The device according to claim 3, further comprising:

a first reset transistor that supplies a reset signal for initializing the first voltage to an input terminal of the first amplification transistor when a first reset control signal becomes active, and a second reset transistor that supplies a reset signal for initializing the second voltage to an input terminal of the second amplification transistor when a second reset control signal different from the first reset control signal becomes active.

5. The device according to claim 4, further comprising:

a first reset control signal line that transmits the first reset control signal, and a second reset control signal line that transmits the second reset control signal.

6. The device according to claim 3, further comprising:

a first select transistor provided between the first output signal line and the first amplification transistor, and a second select transistor controlled according to a select signal common with the first select transistor and provided between the second output signal line and the second amplification transistor.

7. The device according to claim 1, further comprising a composite circuit that composites the first and the second output voltages together and outputs the image data.

8. A camera system comprising:

a focus lens, and the imaging device according to claim 1, which outputs an incident light through the focus lens as the image data.

9. A camera system comprising:

a focus lens;

the imaging device according to claim 1, which converts an incident light through the focus lens into the first and the second output voltages and outputs the first and the second output voltages, and a composite circuit that composites the first and the second output voltages output from the imaging device and outputs the image data.

10. An imaging method comprising the steps of:

receiving an incident light through a microlens by first and second photoelectric transducers;

transferring electric charges output from the first photoelectric transducer when a first transfer control signal becomes active;

transferring electric charges output from the second photoelectric transducer when a second transfer control signal different from the first transfer control signal becomes active, and outputting a first output voltage depending on the electric charges output from the first photoelectric transducer and a second output voltage depending on the electric charges output from the second photoelectric transducer, in parallel, wherein the electric charges output from the first photoelectric transducer are obtained by performing a long second exposure, the electric charges output from the second photoelectric transducer are obtained by performing a short second exposure, and the short second exposure starts after the long second exposure starts.

11. The method according to claim 10, comprising the steps of:

initializing the electric charges of the first photoelectric transducer by temporarily activating the first transfer control signal, to start the long second exposure through the incident light by the first photoelectric transducer;

initializing the electric charges of the second photoelectric transducer by temporarily activating the second transfer control signal, to start the short second exposure through the incident light by the second photoelectric transducer at such a timing that makes an ending time of the short second exposure in accordance with an ending time of the long second exposure;

transferring the output electric charges of the first and the second photoelectric transducers respectively by temporarily activating the first and the second transfer control signals again, to respectively finish the long second exposure and the short second exposure, and outputting the first output voltage depending on the electric charges of the first photoelectric transducer and the second output voltage depending on the electric charges of the second photoelectric transducer, in parallel.

12. The method according to claim 10, comprising the steps of:

initializing the electric charges of the first photoelectric transducer by temporarily activating the first transfer control signal, to start the long second exposure through the incident light by the first photoelectric transducer;

initializing the electric charges of the second photoelectric transducer by temporarily activating the second transfer control signal, to start the short second exposure through the incident light by the second photoelectric transducer at such a timing that makes an intermediate time of the short second exposure in accordance with an intermediate time of the long second exposure;

transferring the electric charges output from the second photoelectric transducer by temporarily activating the second transfer control signal again, to finish the short second exposure;

transferring the electric charges output from the first photoelectric transducer by temporarily activating the first transfer control signal again, to finish the long second exposure, and outputting the first output voltage depending on the electric charges of the first photoelectric transducer and the second output voltage depending on the electric charges of the second photoelectric transducer, in parallel.

13. An imaging method comprising the steps of:

receiving an incident light through a microlens by first and second photoelectric transducers;

transferring electric charges output from the first photoelectric transducer when a first transfer control signal becomes active;

transferring electric charges output from the second photoelectric transducer when a second transfer control signal different from the first transfer control signal becomes active, and outputting a first output voltage depending on the electric charges output from the first photoelectric transducer and a second output voltage depending on the electric charges output from the second photoelectric transducer, in parallel starting a first predetermined exposure through the incident light by the first photoelectric transducer and starting a second predetermined exposure through the incident light by the second photoelectric transducer, by temporarily activating the first and the second transfer control signals;

by temporarily activating the first and the second transfer control signals again, transferring the electric charges of the first and the second photoelectric transducers, to finish the first and the second predetermined exposures and start the short second exposure through the incident light by the second photoelectric transducer;

outputting the first and the second output voltages respectively depending on the electric charges of the first and the second photoelectric transducers through the first and the second predetermined exposures;

by temporarily activating the second transfer control signal again, transferring the electric charges output from the second photoelectric transducer to finish the short second exposure, and further outputting the second output voltage depending on the electric charges of the second photoelectric transducer through the short second exposure.

14. An imaging device comprising:

a first photoelectric transducer that receives an incident light through a microlens;

a second photoelectric transducer that receives an incident light through the microlens common with the first photoelectric transducer;

a first transfer transistor that transfers electric charges output from the first photoelectric transducer when a first transfer control signal becomes active;

a second transfer transistor that transfers electric charges output from the second photoelectric transducer when a second transfer control signal different from the first transfer control signal becomes active;

a first output signal line that transmits a first output voltage depending on the electric charges transferred by the first transfer transistor;

a second output signal line that transmits a second output voltage depending on the electric charges transferred by the second transfer transistor;

a first amplification transistor that amplifies a first voltage generated by the electric charges transferred by the first transfer transistor and outputs the first output voltage to the first output signal line;

a second amplification transistor that amplifies a second voltage generated by the electric charges transferred by the second transfer transistor and outputs the second output voltage to the second output signal line;

a first reset transistor that supplies a reset signal for initializing the first voltage to an input terminal of the first amplification transistor when a first reset control signal becomes active;

a second reset transistor that supplies a reset signal for initializing the second voltage to an input terminal of the second amplification transistor when a second reset control signal different from the first reset control signal becomes active;

a first reset control signal line that transmits the first reset control signal, and a second reset control signal line, which is different from the first reset control signal line, that transmits the second reset control signal.

* * * * *